United States Patent [19]

Sarkar

[11] 4,415,695
[45] Nov. 15, 1983

[54] METHOD FOR PREPARING COLOR-FREE, STABILIZED POLYMERS OF CONJUGATED DIENES OR VINYL AROMATIC HYDROCARBONS OR COPOLYMERS OF CONJUGATED DIENES AND VINYL AROMATIC HYDROCARBONS

[75] Inventor: Sunil B. Sarkar, Akron, Ohio

[73] Assignee: The Firestone Tire & Rubber Company, Akron, Ohio

[21] Appl. No.: 362,175

[22] Filed: Mar. 25, 1982

[51] Int. Cl.$^3$ ............................................... C08K 3/38
[52] U.S. Cl. .................................... 524/405; 524/151; 525/250; 525/337; 526/173; 528/490
[58] Field of Search ............... 524/405; 525/337, 250; 526/173; 528/490

[56] References Cited

U.S. PATENT DOCUMENTS

| | | | |
|---|---|---|---|
| 3,029,221 | 4/1962 | Welch | 526/173 |
| 3,030,346 | 4/1962 | Cooper, Jr. | 526/73 |
| 3,068,197 | 12/1962 | Rocklin | 526/173 |
| 3,094,512 | 6/1963 | Short | 526/173 |
| 3,317,918 | 5/1967 | Foster | 526/173 |
| 3,464,961 | 9/1969 | Foster | 526/173 |
| 3,520,858 | 7/1970 | Bodnar et al. | 526/173 |
| 3,801,520 | 4/1974 | Hogan et al. | 528/490 |
| 3,872,068 | 3/1975 | Horiie et al. | 526/173 |
| 4,220,738 | 9/1980 | Miki et al. | 525/250 |

OTHER PUBLICATIONS

Hackh's Chemical Dictionary, 4th. Ed., 1972, pp. 10, 12, 13, 106 and 161.

*Primary Examiner*—John Kight, III
*Assistant Examiner*—R. A. White

[57] ABSTRACT

A method for preparing essentially color-free, stabilized polymers of conjugated dienes or vinyl aromatic hydrocarbons or copolymers of conjugated dienes and vinyl aromatic hydrocarbons involves a first stage in which a living polymer of a conjugated diene or vinyl aromatic hydrocarbon or copolymer of a conjugated diene and a vinyl aromatic hydrocarbon is prepared by anionically polymerizing the conjugated diene or vinyl aromatic hydrocarbon, or copolymerizing the conjugated diene and the vinyl aromatic hydrocarbon using a lithium-based catalyst and an inert hydrocarbon diluent. Then, the living polymer or copolymer is terminated by the addition of a suitable terminating agent. Following the termination procedure, boric acid is added to the polymer of copolymer in a sufficient amount to prevent or substantially reduce color formation. Then, stabilizing agents are added to the polymer or copolymer and the polymer or copolymer is recovered from the diluent.

15 Claims, No Drawings

METHOD FOR PREPARING COLOR-FREE, STABILIZED POLYMERS OF CONJUGATED DIENES OR VINYL AROMATIC HYDROCARBONS OR COPOLYMERS OF CONJUGATED DIENES AND VINYL AROMATIC HYDROCARBONS

BACKGROUND OF THE INVENTION

The invention relates to a method for preparing essentially color-free, stabilized polymers of conjugated dienes or vinyl aromatic hydrocarbons or copolymers or conjugated dienes and vinyl aromatic hydrocarbons. More particularly, the invention relates to a method for preparing essentially color-free, stabilized polymers of conjugated dienes or vinyl aromatic hydrocarbons or copolymers of conjugated dienes and vinyl aromatic hydrocarbons which involves the use of boric acid as a treating agent to prevent or substantially reduce the formation of color in the polymer or copolymer.

Color-free polymers and copolymers are of increasing interest. Thus, for example, color-free block copolymers of conjugated dienes and vinyl aromatic hydrocarbons, particularly those having high contents of vinyl aromatic hydrocarbon, have enjoyed increased usage in applications such as garment hangers, food containers, food packaging materials, beverage cups, medical sundries and the like.

A number of block copolymers of the aforementioned type and methods for their preparation have been described in the prior art as illustrated by U.S. Pat. Nos. 3,639,517 to Kitchen et al; 4,067,942 to Wilson; 4,073,831 to Tabana et al; 4,086,298 to Fahrback et al; 4,089,913 to Miki et al; 4,117,545 to Fahrback et al; 4,195,136 to Sato et al and 4,208,356 to Fukawa et al and U.S. Defensive Publications T953,011; T954,012; T959,011 and T967,004 to Smith.

While the block copolymers described in the above patents and publications exhibit many advantageous properties, they have been found to suffer from a significant disadvantage which materially detracts from their usefulness in applications where lack of color is a critical property such as in food containers, food packaging materials, beverage cups and the like. Thus, it has been found that block copolymers of conjugated dienes and vinyl aromatic hydrocarbons, particularly those having high contents of vinyl aromatic hydrocarbons, often exhibit a yellowish cast or tint as prepared, or develop such a yellowish cast or tint under conditions of storage and use. In fact, applicant has surprisingly discovered that this tendency to exhibit or develop a yellowish cast or tint is not limited to block copolymers containing high contents of vinyl aromatic hydrocarbons, but also extends to block copolymers having low contents of vinyl aromatic hydrocarbon, random copolymers of conjugated dienes and vinyl aromatic hydrocarbons and even homopolymers of conjugated dienes or vinyl aromatic hydrocarbons.

Accordingly, the discovery of an uncomplicated method for preparing stabilized polymers of conjugated dienes or vinyl aromatic hydrocarbons or copolymers of conjugated dienes and vinyl aromatic hydrocarbons which are essentially color-free as prepared, and which do not develop undesirable color under normal conditions of strorage and use, is highly desirable and would represent a development of major significance.

SUMMARY OF THE INVENTION

In accordance with the present invention, a method for preparing essentially color-free, stabilized polymers of conjugated dienes or vinyl aromatic hydrocarbons or copolymers of conjugated dienes and vinyl aromatic hydrocarbons has been found.

The method of the invention comprises the steps of:
(a) preparing a living polymer of a conjugated diene or a vinyl aromatic hydrocarbon or a copolymer of a conjugated diene and a vinyl aromatic hydrocarbon by anionically polymerizing the conjugated diene or vinyl aromatic hydrocarbon, or anionically copolymerizing the conjugated diene and the vinyl aromatic hydrocarbon using a lithium-based catalyst and an inert hydrocarbon diluent;
(b) adding a terminating agent to said living polymer or copolymer;
(c) adding boric acid to the terminated polymer or copolymer in a sufficient amount to prevent the formation of color;
(d) adding stabilizing agents to said polymer or copolymer; and
(e) recovering an essentially color-free, stabilized polymer or copolymer.

In a particularly advantageous embodiment of the method of the invention, the terminating agent and the boric acid are simultaneously added to the living polymer or copolymer in order to reduce the number of process steps.

The essentially color-free, stabilized polymers and copolymers prepared by the method of the invention are not only essentially color-free as prepared but do not develop undesirable color under normal conditions of storage and use. Copolymers which may be prepared by this method include random copolymers and multiblock copolymers.

DETAILED DESCRIPTION OF THE INVENTION

The term "essentially color-free" as applied to the polymers and copolymers herein and as used throughout the specification and claims refers to polymers or copolymers that are either of water-like color or are only slightly colored.

The term "polymer" or "copolymers" as used throughout the specification and claims refers to homopolymers of conjugated dienes or vinyl aromatic hydrocarbons and copolymers of conjugated diene and vinyl aromatic hydrocarbons.

The term "stabilized" as applied to the polymers and copolymers herein and as used throughout the specification and claims means that the polymers and copolymers have been protected against degradation by heat and oxidation.

The term "copolymerizing" as used throughout the specification and claims refers to the polymerization of two or more monomers and includes polymerization in which two or more monomers are polymerized simultaneously, sequentially or incrementally.

The term "multiblock copolymers" as used throughout the specification and claims and means that the block copolymers contains two or more homopolymer or copolymer blocks and is intended to include not only individual block copolymers but also mixtures of block copolymers.

The term "inert" diluent refers to a diluent which does not appreciably terminate anionic polymerization.

Living polymers of conjugated dienes or vinyl aromatic hydrocarbons may be prepared in the first step or stage of the method of the invention. The polymers may be prepared by any well known procedure. Thus, for example, such a polymer can be prepared by anionically polymerizing a conjugated diene monomer or a vinyl aromatic hydrocarbon monomer using a lithium-based catalyst and an inert hydrocarbon diluent.

Various living copolymers of conjugated dienes and vinyl aromatic hydrocarbons may be prepared in the first step of the method of the invention. Thus, the copolymers may be random copolymers or multiblock copolymers of varying structures including those having high contents of vinyl aromatic hydrocarbon. Virtually any living copolymer of a conjugated diene and a vinyl aromatic hydrocarbon containing virtually any ratios of conjugated diene units to vinyl aromatic hydrocarbon units may be prepared. For example, the copolymers may contain ratios of conjugated diene units: vinyl aromatic hydrocarbon units which may range from 0.1:99.9 to 99.9:0.1. However, the method of the invention is not limited by the specific quantities of conjugated dienes and vinyl aromatic hydrocarbons utilized to prepare the copolymer or by the specific structure of the copolymer. It is applicable to essentially all such copolymers. The copolymers may be prepared by anionically polymerizing or copolymerizing the conjugated diene and the vinyl aromatic hydrocarbon using a lithium-based catalyst and an inert hydrocarbon diluent utilizing any known procedure.

As will be evident from the discussion which follows, the preparation of the copolymer, particularly if it is a block copolymer, can involve either a single step polymerization procedure or a multi-step polymerization procedure depending upon the specific type copolymer which is to be prepared.

As will be appreciated, specific quantities of conjugated diene and vinyl aromatic hydrocarbon used to prepare the copolymer will depend upon the type copolymer and properties which are desired. Thus, by utilizing appropriate quantities of conjugated diene and vinyl aromatic hydrocarbon along with appropriate polymerization techniques, random copolymers of rubbery or elastomeric character and multiblock copolymers having the properties of elastomers, thermoplastic elastomers or plastics may be produced.

The random copolymers may be prepared by any known procedure. Thus, for example, the random copolymer can be prepared by charging a mixture of conjugated diene and vinyl aromatic hydrocarbon monomers to the polymerization reactor at a rate slower than the normal polymerization rate as described in U.S. Pat. No. 3,094,512, the disclosure of which is incorporated by reference. Alternatively, the random copolymer can be prepared by copolymerizing a mixture of the monomers in the presence of a randomizing agent such as an ether, amine, chelating diamine or other polar compound. A typical illustration of this technique is described in U.S. Pat. No. 3,451,988, the disclosure of which is incorporated herein by reference.

Multiblock copolymers may be prepared by any of the block polymerization techniques heretofore known and utilized in the block copolymer art. Thus, for example, the multiblock copolymers can be prepared by the so-called sequential addition of monomer technique. This technique involves the polymerization of a first monomer by anionic polymerization in solution, using a suitable initiator of anionic polymerization such as butyl lithium, until complete conversion of monomer to polymer has been achieved. When a monofunctional initiator such as butyl lithium is employed, the result is a "living polymer" so called because it has a terminal atom carrying a negative charge or "live" end. Then, without terminating the living polymer so formed, the second monomer is added to the reaction solution, and polymerization of this second monomer onto the live end of the previously formed living polymer is initiated by the living polymer itself. After complete polymerization of the second monomer, a two-block copolymer has been formed, and a copolymer having the desired number of blocks can be prepared by repeating the steps as necessary, provided only that the preformed polymer is not terminated at any stage of the process.

Alternatively, if desired, triblock copolymers of the A-B-A or B-A-B type wherein A is a polymer block consisting of polymerized vinyl aromatic hydrocarbon units, and B is a polymer block consisting of polymerized conjugated diene units may be produced by a coupling process in which A-B Li or B-A Li living polymer chains are first formed by the above-described sequential addition of monomer technique and the polymer chains are then coupled utilizing a suitable coupling agent such as an alkane dichloride, carbon monoxide, $CCl_4$, $SiCl_4$, divinylbenzene and the like. Typical procedures of this type are described in U.S. Pat. Nos. 3,598,887 and 4,219,627, the disclosures of which are incorporated herein by reference.

Tapered copolymer blocks may be incorporated in the multiblock copolymers in known manner by copolymerizing a mixture of the conjugated diene and vinyl aromatic hydrocarbon monomers utilizing the difference in their copolymerization reactivity rates. In this situation, the conjugated diene polymerizes first along with a small amount of vinyl aromatic hydrocarbon to form a tapered copolymer block, then the vinyl aromatic hydrocarbon polymerizes to form a homopolymer block. As will be evident to those skilled in the block polymer arts, multiblock copolymers having various structures in which one or more of the blocks is a tapered copolymer block can be prepared by this technique. A number of patents and publications describe the preparation of multiblock copolymers containing tapered copolymer blocks including U.S. Pat. Nos. 3,251,905; 3,265,765; 3,639,521 and 4,208,356 and U.S. Defensive Publications T953,001 and T967,004, the disclosures of which are all incorporated herein by reference.

As mentioned above, such multiblock copolymers include those having high contents of vinyl aromatic hydrocarbon. These may be prepared by the procedures described in the aforementioned U.S. Pat. No. 4,208,356 and Defensive Publications T953,001 and T967,004.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. The preferred conjugated diene is 1,3-butadiene.

Vinyl aromatic hydrocarbons which may be utilized to prepare the polymers or copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene. Lithium-based catalysts which may be utilized to prepare the polymers or copolymers include any of those employed heretofore in preparing such polymers or copolymers by anionic polymerization. In general, lithium-based catalysts which may be utilized include lithium metal, alkyllithium compounds, aryllithium compounds or mixtures thereof. A broad description of suitable catalysts of these types is set forth in U.S. Pat. No. 3,317,918. The preferred lithium-based catalysts are the alkyllithium compounds such as methyllithium, ethyllithium, isopropyllithium, n-butyllithium, sec-butyllithium, t-butyllithium, amyllithium, hexyllithium, p-octyllithium, n-decyllithium, cyclohexyllithium, allyllithium, methallyllithium and the like. The specifically preferred catalyst is n-butyllithium.

Inert hydrocarbon diluents which may be utilized to prepare the polymers or copolymers include any of those employed heretofore in preparing such polymers or copolymers. Suitable diluents include butane, hexane, toluene, cyclohexane, methyl cyclohexane, heptane, pentane, isopentane, tetrahydrofuran, benzene, cyclopentane, methyl cyclopentane, octane, isooctane and the like. Mixtures of the above-mentioned diluents may also be employed. The preferred diluent is hexane or cyclohexane.

The second step in the method of the invention involves terminating the living polymer or copolymer produced in the first step by the addition thereto of a suitable terminating or chain stopping agent.

Any of the known terminating agents used to terminate living polymers and copolymers prepared by lithium-based catalysts may be employed including water, lower alkanols (e.g., methanol, ethanol, isopropanol etc.), amines, mercaptans and the like. The preferred terminating agents are water, lower alkanols and mixtures thereof.

The next and most important step in the method of the invention involves treating the terminated polymer or copolymer by the addition of boric acid thereto. Specific amounts of boric acid to be added depend upon the nature of the polymer or copolymer which is prepared. In general, the amount of boric acid to be added may be an amount sufficient to prevent or substantially reduce the formation of color in the polymer or copolymer, but which is insufficient to cause degradation of the polymer properties. Suitable amounts of boric acid may range from 0.02 to 1.0 parts by weight per 100 parts by weight of polymer or copolymer with the preferred amounts being from 0.1 to 0.5 parts by weight.

As mentioned above, a particular advantageous embodiment of the method of the invention involves the simultaneous addition of the terminating agent and the boric acid to the living polymer or copolymer in order to reduce the number of process steps. This is preferably accomplished by adding the boric acid and the terminating agent to the living polymer or copolymer in the form of a solution or dispersion of the boric acid in the terminating agent utilizing a terminating agent in which the boric acid is soluble or at least partially soluble such as water.

It should be noted at this time that the order of addition of the boric acid to the polymer or copolymer is a critical feature of the method of the invention. Thus, the boric acid can be added either simultaneously with or subsequent to the addition of the terminating agent. However, the boric acid addition must precede the addition of the stabilizing agents. It has surprisingly and unexpectedly been found that if the boric acid is not added to the polymer or copolymer prior to the addition of stabilizing agents, it will not serve to prevent the formation of color in the finished polymer or copolymer.

In fact, it was surprising and unexpected for applicant to discover in accordance with the invention that the boric acid treatment of the polymer or copolymer results not only in the prevention or reduction of color formation in the polymer or copolymer as prepared, but also prevents or substantially reduces the formation of color in polymers or copolymers under normal conditions of storage and use. Moreover, it has surprisingly and unexpectedly additionally been found as shown in the examples below that the boric acid treatment not only prevents or substantially reduces color formation in the polymer or copolymer, but also results in the preparation of polymers or copolymers having lower gel contents, and even more surprisingly improved heat aging properties than polymers or copolymers prepared without the boric acid treatment.

Following the boric acid addition step, stabilizing agents are added to the polymer or copolymer. Any of the known stabilizing agents heretofore utilized in protecting polymers of conjugated dienes, vinyl aromatic hydrocarbons and copolymers of conjugated dienes and vinyl aromatic hydrocarbons against oxidative and thermal degradation may be added to the polymers or copolymers. Thus, various known antioxidants of the phenolic, organic phosphate, organic phosphite and amine types may be utilized.

The final step in the method of the invention involves recovering the polymer or copolymer from the diluent. This can be accomplished in conventional manner by coagulation techniques, vacuum drying and the like.

The following examples are submitted for the purpose of further illustrating the nature of the present invention and are not to be regarded as a limitation on the scope thereof. Parts and percentages used throughout the specification and claims are by weight unless otherwise indicated.

In Examples 1-4 which follow, various polymers and copolymers were prepared utilizing the boric acid treatment in accordance with the method of the invention. For comparative purposes, control polymers and copolymers were prepared utilizing essentially the same procedure except for the omission of the boric acid addition step. The unaged polymers and copolymers were evaluated for color characteristics using the APHA Color Method, the Gardner Color Method and a Visual Rating Color Method in which liquid samples of the polymers or copolymers are employed. The aged polymers and copolymers were evaluated for color characteristics using a Visual Rating Color Method in which solid samples are employed. Gel contents were evaluated by visual observation of aged samples.

The APHA Color Method utilized herein was conducted substantially in accordance with the procedure set forth in ASTM D2849. The method involves the visual measurement of the color of liquids. The apparatus employed in the method was a Hellige Aqua Tester, Model 611 equipped with color Disc No. 611-11.

The Hellige Aqua Tester is a precise visual instrument for rapid and accurate tests in the modern water laboratory. It is the most advanced apparatus of its type and can be used for extremely pale color solutions. The Nessler tubes of the Aqua Tester are excellent because of their long viewing depth (200 mm—about 8 inches) which greatly increases the intensity of the color and produces distinct easy-to-see steps. In use, the color disc is placed on a fitting at the top of the Aqua Tester. The edge of the disc protrudes from the housing for finger tip control. A test is made by simply revolving the disc which brings one color after another into the observation field until a color match is obtained between the treated test sample in the Nessler tube and one of the standards. For increased accuracy, the apparatus is provided with a prism and magnifying lens to bring the colors side-by-side into one enlarged field.

The procedure involves first filling up a standard tube with toluene up to a mark, then a second tube is filled up to the same mark with a 20% solution of polymer or copolymer solution. The colors of the sample and the standard are compared by viewing vertically down through the tubes against a white background. The color of the sample is reported in terms of the color standard number that is nearest to it in color.

The Gardner Color Method utilized herein was conducted substantially in accordance with the procedure set forth in ASTM D2849. This method also involves the visual measurement of the color of liquids. The apparatus utilized are Gardner-Holdt tubes; 1953 Series, 1 to 18 scale. The primary standards for color shall consist of solutions defined by their spectral transmittance in a 1-cm cell with parallel sides. The procedure involves filling up the empty tubes with the sample (20% polymer or copolymer solution in toluene), free of solid particles or air bubbles so that the apparent upper edge of the liquid meniscus is even with the lowest etched line on the tube. The color comparison is made by placing the tubes close together and looking through them against a background that is substantially equal in color. The color of the sample is reported in terms of the Gardner standard number that is nearest to it in color.

The Visual Rating Color Method employed on unaged samples was a subjective rating made by visual observation. The visual observations were made by a seven (7) member panel consisting of five (5) professionals and two (2) non-professionals. Prior to the visual observations, the panel established a color rating system of number values ranging from 1 to 3 in which 1=colorless, 2=slightly yellow and 3=deep yellow. The procedure involved first preparing 20% solutions of polymer or copolymer in toluene. The solutions were prepared in 4-ounce bottles. The bottles were then placed horizontally on a white paper background. The color of the polymer solutions was then observed by the individual members of the panel and a color rating number of 1–3 was assigned to each solution sample.

The Visual Rating Color Method employed on aged samples of polymer and copolymer was also a subjective rating made by visual observation. The visual observations were made using a seven (7) member panel and the same rating system as utilized with unaged samples. However, the procedure varied from that utilized on unaged samples in that the observations were conducted on solid samples. The general procedure involved first milling a sample of the vacuum dried polymer or copolymer and then cutting the resultant polymer sheet into cubes of 1/16" to ⅛" size. The samples were then placed in an aluminum pan and oven aged at 212° F. for six (6) days. Color observations were then made on the aged samples. It should be noted here that this heat aging evaluation was conducted under much more severe conditions than the polymer or copolymer will encounter during normal storage and use. It was designed to show the efficiency of the process in reducing color formation under severe conditions.

The gel study or evaluation was also conducted on aged polymer or copolymer samples using the visual observation method. The procedure involved first aging solid samples of polymer or copolymer at 212° F. for six (6) days. Then, samples of the aged polymer or copolymer were added to a glass container along with a sufficient amount of toluene to form a 10% solids mixture of polymer or copolymer and toluene. An attempt was made to dissolve the polymer or copolymer in the toluene by placing the mixture in a shaker and mixing overnight. The gel content was visually observed by noting the amount of undissolved polymer or copolymer remaining in the vessel.

EXAMPLE 1

This Example illustrates the preparation of an essentially color-free, stabilized polybutadiene homopolymer by the method of the invention. For comparative purposes, a polybutadiene homopolymer was prepared in the same manner except for omission of the boric acid addition step. The polymers were prepared in accordance with the following procedure.

To each of six (6) glass bottles previously purged with nitrogen were charged 50.0 grams of 1,3-butadiene, 0.040 grams of n-butyllithium and 228.0 grams of hexane. Polymerizations were conducted in a polymerization box by heating the glass bottles at 140° F. for six (6) hours. The resulting living polybutadiene polymers in the form of 18% solids solutions in hexane were terminated by adding 1.0 gram of a 1:1 mixture of water/isopropanol to each bottle. Then, the contents of the bottles were combined in a single vessel and thoroughly mixed together.

The resulting polybutadiene polymer solution was divided into two (2) equal portions. To one portion of polymer solution was added a 4% aqueous solution of boric acid in an amount of 0.5 parts by weight of boric acid per 100 parts by weight of polymer. Following the boric acid addition, 0.25 parts by weight of Irganox ®1076 and 1.0 part by weight of TNPP stabilizers per 100 parts by weight of polymer were added to the polymer solution. Irganox ®1076 is a phenolic type antioxidant stabilizer available from Ciba Geigy and TNPP is a polymeric phosphite stabilizer available from Borg-Warner.

To the second portion of polymer solution only the above stabilizers in the indicated proportions were added (i.e., no boric acid addition). This portion of polymer solution served as the control.

The polymers from both polymer solutions were recovered by vacuum drying under 26–28 inches of mercury at a temperature of 140° F. for eight (8) hours. Samples of the polymers were then evaluated for color characteristics as prepared (unaged), after oven aging for six (6) days at 212° F., and the aged samples were visually examined for the presence of polymer gel utilizing the procedures described above. Results are shown in Table I.

TABLE I

| Example No. | Control | 1 |
|---|---|---|
| Boric acid addition | no | yes |
| Color Measurement (unaged samples) | | |
| APHA | 70–80 | 30–40 |
| Gardner | >1 | <1 |
| Visual Rating* | 2 | 1 |
| Color Measurement (oven aged samples) | | |

TABLE I-continued

| Example No. | Control | 1 |
|---|---|---|
| Visual Rating | 3+ | 1 |
| Visual Gel (aged samples) | yes | no |

*The visual ratings were done by a panel of seven members. Number values established by the panel were 1 = colorless, 2 = slightly yellow and 3 = deep yellow.

As the above data indicates, the polybutadiene homopolymer treated with boric acid in accordance with the method of the invention exhibited essentially no color as prepared, did not develop color after heat aging and did not develop gel after heat aging. In contrast, the polybutadiene control which was prepared in the same manner except for the absence of the boric acid treatment exhibited a slightly yellow color as prepared, developed a deep yellow color after heat aging and contained a significant amount of gel after heat aging.

EXAMPLE 2

This Example illustrates the preparation of an essentially color-free, stabilized random copolymer of butadiene/styrene containing 20% of units derived from styrene in accordance with the method of the invention. For comparative purposes, a random copolymer of the same structure was prepared in the same manner except for omission of the boric acid addition step. Copolymer preparations were conducted using the following procedure.

To each of six (6) glass bottles previously purged with nitrogen were charged 48.0 grams of 1,3-butadiene, 12.0 grams of styrene, 226.0 grams of hexane, 0.046 grams of n-butyllithium and 0.25 grams of tetramethyl ethylene diamine (TMEDA) randomizing agent. Polymerization were conducted in a polymerization box by heating the glass bottles at 140° F. for six (6) hours. The resulting living random copolymers of butadiene/styrene in the form of 21% solids solutions in hexane were terminated by adding 1.0 gram of a 1:1 mixture of water/isopropanol to each bottle. Then, the contents of each bottle were combined in a single vessel and thoroughly mixed.

The resulting copolymer solution was divided into two (2) equal portions. To one portion of copolymer solution was added a 4% aqueous solution of boric acid in an amount of 0.5 parts by weight of boric acid per 100 parts by weight of copolymer. Following the boric acid addition, 0.25 parts by weight of Irganox ®1076 and 1.0 part by weight of TNPP stabilizers were added to the copolymer solution.

To the second portion of copolymer solution only the above stabilizers in the indicated proportions were added. This portion of copolymer solution served as the control.

The copolymers from both copolymer solutions were recovered by vacuum drying under 26–28 inches of mercury at a temperature of 140° F. for eight (8) hours. Samples of the copolymers were then evaluated for color characteristics and gel content utilizing the same tests and procedures as set forth in Example 1. Results are shown in Table II.

TABLE II

| Example No. | Control | 2 |
|---|---|---|
| Boric acid addition | no | yes |
| Color Measurement (unaged) | | |
| APHA | 70–80 | 40–50 |
| Gardner | >1 | <1 |
| Visual Rating | 3 | 2 |
| Color Measurement (aged) | | |
| Visual Rating | 3+ | 2+ |
| Visual Gel (aged) | yes (heavy) | no |

EXAMPLE 3

This Example illustrates the preparation of an essentially color-free, stabilized diblock copolymer of butadiene/styrene containing 30% by weight of units derived from styrene and having a structure of the B-A type in which the B block is a tapered butadiene/styrene copolymer block and the A block is a polystyrene block. For comparative purposes, a diblock copolymer of the same structure and styrene content was prepared in the same manner except for omission of the boric acid addition step. The diblock copolymers were prepared in accordance with the following procedure.

To each of six (6) glass bottles previously purged with nitrogen were charged 42.0 grams of 1,3-butadiene, 18.0 grams of styrene, 0.046 grams of n-butyllithium and 226.0 grams of hexane. Polymerization were conducted in a polymerization box by heating the glass bottles at 140° F. for six (6) hours. The resulting living diblock copolymers in the form of 21% solids solutions in hexane were terminated by adding 1.0 gram of a 1:1 mixture of water/isopropanol to each bottle. Then, the contents of each bottle were combined in a single vessel and thoroughly mixed.

The resulting block copolymer solution was divided into two (2) equal portions. To one portion of block copolymer solution was added a 4% aqueous solution of boric acid in an amount of 0.5 parts by weight of boric acid per 100 parts by weight of copolymer. Following the boric acid addition, 0.25 parts by weight of Irganox ®1076 and 1.0 part by weight of TNPP stabilizers per 100 parts by weight of block copolymer were added to the copolymer solution.

To the second portion of copolymer solution only the above stabilizers in the indicated proportions were added. This portion of copolymer solution served as the control.

The copolymers from both copolymer solutions were recovered by vacuum drying under 26–28 inches of mercury at a temperature of 140° F. for eight (8) hours. Samples of the copolymers were then evaluated for color characteristics and gel content utilizing the same tests and procedures as set forth in Example 1. Results are shown in Table III.

TABLE III

| Example No. | Control | 3 |
|---|---|---|
| Boric acid addition | no | yes |
| Color Measurement (unaged) | | |
| APHA | 50–60 | 30–40 |
| Gardner | >1 | <1 |
| Visual Rating | 2 | 1 |
| Color Measurement (aged) | | |
| Visual Rating | 3+ | 2 |
| Gel content (aged) | yes (heavy) | no |

EXAMPLE 4

This Example illustrates the preparation of a diblock copolymer of the same structure as in Example 3 except for the fact that the diblock copolymer contained a high content of vinyl aromatic hydrocarbon (i.e., 70% by weight of units derived from styrene). As in Example 3, for comparative purposes a diblock copolymer of the same structure and styrene content was prepared in the same manner except for omission of the boric acid addition step. The diblock copolymers were prepared in accordance with the following procedure.

To each of six (6) glass bottles previously purged with nitrogen were charged 18.0 grams of 1,3-butadiene, 42.0 grams of styrene, 0.046 grams of n-butyllithium and 226.0 grams of hexane. Polymerizations were conducted in a polymerization box by heating the glass bottles at 140° F. for six (6) hours. The resulting living diblock copolymers in the form of 21% solids solutions in hexane were terminated by adding 1.0 grams of a 1:1 mixture of water/isopropanol to each bottle. Then, the contents of each bottle were combined in a single vessel and thoroughly mixed.

The resulting block copolymer solution was divided into two (2) equal portions. To one portion of block copolymer solution was added a 4% solution of boric acid in an amount of 0.5 parts by weight of boric acid per 100 parts by weight of copolymer. Following the boric acid addition, 0.25 parts by weight of Irganox®1076 and 1.0 part by weight of TNPP stabilizers per 100 parts by weight of block copolymer were added to the copolymer solution.

To the second portion of copolymer solution, only the above stabilizers in the indicated proportions were added. This portion of copolymer solution served as the control.

The copolymers from both copolymer solutions were recovered by vacuum drying under 26-28 inches of mercury at a temperature of 140° F. for eight (8) hours. Samples of the copolymers were then evaluated for color characteristics and gel content utilizing the same tests and procedures as set forth in Example 1. Results are shown in Table IV.

TABLE IV

| Example No. | Control | 4 |
| --- | --- | --- |
| Boric acid addition | no | yes |
| Color Measurement (unaged) | | |
| APHA | 60-70 | 30-40 |
| Gardner | >1 | <1 |
| Visual Rating | 2 | 1 |
| Color Measurement (aged) | | |
| Visual Rating | 2+ | 1 |
| Gel content (aged) | no | no |

As indicated by the above data, stabilized diblock copolymers having a high content of styrene (i.e., 70%) which are essentially color-free can be prepared by the method of the invention.

The following Examples (i.e., 5-7) illustrate the preparation of essentially color-free, stabilized multiblock copolymers containing 70% of units derived from styrene and having the principal structure represented by the formula B-A-B-A wherein B is a tapered butadiene/styrene copolymer block and A is a polystyrene block.

EXAMPLES 5-7

In these Examples, the following procedure was employed.

To a reactor equipped with thermometer, heating means and stirring means was charged 80.0 parts by weight of hexane; (note: all parts used in the preparation of the copolymer are in parts by weight per 100 parts by weight of monomer). Then, a first charge consisting of 12.0 parts 1,3-butadiene, 4.0 parts styrene, 0.028 parts n-butyllithium and 32.0 parts hexane were added to the reactor. Following this addition, the monomers were polymerized at 180° F. for 1 hour. The contents of the reactor were then cooled to 130° F. Following the cooling step, a second charge consisting of 12.0 parts of styrene, 0.028 parts of n-butyllithium and 24.0 parts of hexane were added to the reactor. Polymerization of the added styrene was then conducted at 180° F. for 1 hour. The contents of the reactor were then cooled to 110° F. After cooling, a third charge consisting of 18.0 parts of 1,3-butadiene, 54.0 parts of styrene, 0.016 parts of TMEDA, 0.05 parts of 1,2-butadiene and 164.0 parts of hexane was added. The monomers in the third charge were polymerized by heating at 220° F. for 2-3 hours. The result was a multiblock copolymer solution at 25% total solids in hexane.

Four equal samples of the copolymer solution were then obtained in order to determine the effect of boric acid addition on the copolymer. To one of the samples, which served as the control, 0.20 parts by weight of Irganox®1076 and 0.50 parts by weight of Wytox®345 stabilizers per 100 parts by weight of copolymer were added. Wytox®345 is a polymeric phosphite-type stabilizer which is available from Stephan Chemical Company.

To each of the other three samples (i.e., Examples 5-7) were added 0.03 (Example 5), 0.06 (Example 6) and 0.12 (Example 7) parts by weight of boric acid per 100 parts by weight of copolymer. The boric acid was added in the form of a 4% aqueous solution. Following the boric acid addition, the same stabilizing agents in the indicated proportions were added to each sample.

Each of the above samples of copolymer solution were then drum dried, sheeted on a mill and extruded through a mini pelletizer. Visual observation of the pelletized samples showed that each of the boric acid treated samples (i.e., Examples 5-7) exhibited less color than the control sample. Samples of the copolymers were then evaluated for color characteristics and gel content utilizing the same tests and procedures as set forth in Example 1. Results are shown in Table V.

TABLE V

| Example No. | Control | 5 | 6 | 7 |
| --- | --- | --- | --- | --- |
| Boric acid addition | no | yes | yes | yes |
| Color Measurement (unaged) | | | | |
| APHA | 20-25 | 10-12.5 | 10-12.5 | 10-12.5 |
| Gardner | >1 | <1 | <1 | <1 |
| Visual Rating | 2 | 1 | 1 | 1 |
| Color Measurement (aged) | | | | |
| Visual Rating | 3 | <1 | <1 | <1 |
| Gel content (aged) | no | no | no | no |

What is claimed is:
1. A method of preparing an essentially color-free, stabilized polymer of a conjugated diene or vinyl aro- matic hydrocarbon or a copolymer of a conjugated diene and a vinyl aromatic hydrocarbon comprising:

(a) preparing a living polymer of a conjugated diene or vinyl aromatic hydrocarbon or a copolymer of a conjugated diene and a vinyl aromatic hydrocarbon by anionically polymerizing the conjugated diene or vinyl aromatic hydrocarbon or anionically copolymerizing the conjugated diene and the vinyl aromatic hydrocarbon using a lithium-based catalyst and an inert hydrocarbon diluent;

(b) adding a terminating agent to said living polymer or copolymer;

(c) adding boric acid to the terminated polymer or copolymer in sufficient amount to prevent or substantially reduce the formation of color;

(d) adding stabilizing agents to said polymer or copolymer; and (e) recovering an essentially color-free, stabilized polymer or copolymer.

2. The method of claim 1 wherein the terminating agent and boric acid are simultaneously added to said living polymer or copolymer.

3. The method of claim 2 wherein the simultaneous addition of terminating agent and boric acid is accomplished by adding a solution of the boric acid in the terminating agent to the living polymer or copolymer.

4. The method of claim 3 wherein said solution is a solution of boric acid in water.

5. The method of claim 1 wherein said terminating agent is selected from the group consisting of lower alkanols, water and mixtures thereof.

6. The method of claim 1 wherein the terminating agent is a mixture of isopropanol and water.

7. The method of claim 1 wherein the amount of boric acid added is from 0.02 to 1.0 parts by weight per 100 parts by weight of polymer or copolymer.

8. The method of claim 7 wherein the amount of boric acid added is from 0.1 to 0.5 parts by weight per 100 parts by weight of polymer or copolymer.

9. The method of claim 1 wherein said polymer is polybutadiene.

10. The method of claim 1 wherein said polymer is polystyrene.

11. The method of claim 1 wherein said copolymer is a random copolymer of butadiene and styrene.

12. The method of claim 1 wherein said copolymer is a block copolymer of a conjugated diene and a vinyl aromatic hydrocarbon.

13. The method of claim 12 wherein said copolymer is a block copolymer of butadiene and styrene.

14. The method of claim 12 wherein said copolymer is a block copolymer containing one or more tapered conjugated diene/vinyl aromatic hydrocarbon copolymer blocks.

15. The method of claim 14 wherein said tapered copolymer block is a tapered butadiene/styrene copolymer block.

* * * * *